Patented Oct. 9, 1934

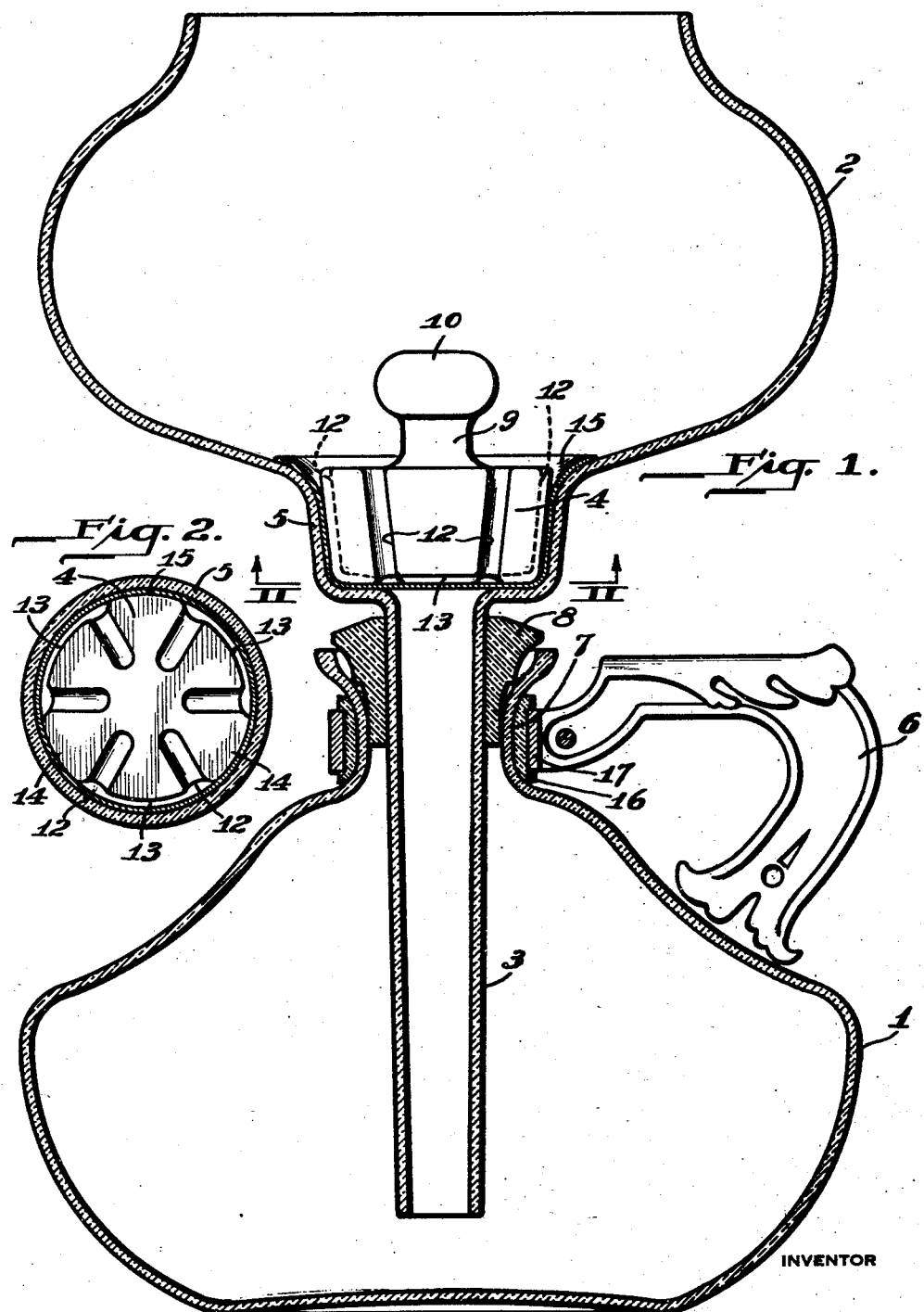

1,976,620

UNITED STATES PATENT OFFICE 1,976,620

COFFEE MAKER

George D. Macbeth, Pittsburgh, Pa., assignor to Macbeth-Evans Glass Company, Charleroi, Pa., a corporation of Pennsylvania Application January 30, 1933, Serial No. 654,136

5 Claims. (Cl. 53—3)

My invention relates to coffee makers and particularly to coffee makers of the so-called vacuum type in which liquid is caused to flow automatically by pressure or vacuum from one container to another.

It has been proposed heretofore to provide coffee makers of the same general type as that of the present invention but the devices of the prior art have had certain disadvantages that are avoided in the coffee maker of my invention. For example, certain coffee makers that employ fabric or other straining material for preventing the flow of sediment from the upper container to the lower container include the provision of devices for holding the straining cloth of fabric in position.

Such devices have been held rigidly in position so that they cannot yield in response to excessive pressure that may be generated in the lower container. It is well known that steam may be evolved relatively rapidly and unless ample passageways are available for the flow of water or the escape of such steam at the rate at which it is evolved, there is danger of the lower container bursting by reason of excessive pressure therein.

In accordance with the present invention, I provide a coffee maker in which fabric or other straining material is employed in conjunction with a gravity-seated member for retaining it in position. This retaining member is of such weight that it will normally retain the straining material in operative position but it will yield upwardly in case excessive pressures are developed in the lower container.

A further feature of the straining device is that it is not provided with perforations but has on its outer periphery a series of grooves for facilitating the flow of liquid from one container to the other. Portions of the periphery between certain pairs of these grooves are of reduced radius, with the result that the retaining device is provided with three angularly spaced portions of longer radius which operate to clamp the straining cloth between the retaining device and the surrounding walls. The provision of three projecting portions is of particular convenience inasmuch as this number permits the rotation of the retaining device to such position that it will fall to its seat.

It is well known that in blowing articles of glass into a mold, the exterior surfaces may be of uniform contour and entirely symmetrical, but it is substantially impossible to obtain perfectly uniform wall thickness, and, accordingly, the interior surfaces of such articles may be somewhat irregular in shape. Accordingly, it is difficult to provide cooperating articles that are interchangeable with surfaces formed in this manner. However, by providing the retaining member with three projections for engaging the straining cloth, the member may be adjusted angularly to a suitable position in which it will readily drop by gravity to its seat.

The details of my invention will be described in connection with the accompanying drawing, in which, Fig. 1 is a central vertical section of a coffee maker constructed in accordance with my invention; Fig. 2 is a transverse horizontal section taken on the line II—II of Fig. 1.

Referring to Fig. 1, the coffee maker of my invention comprises a lower container 1, an upper container 2 having an integral tube extending vertically into the lower container 1, a member 4 for retaining straining material in the annular portion 5 at the bottom of the container 2 and a handle 6 for the lower container 1.

The lower container 1, which is preferably of glass, is provided at its top with a relatively small neck portion 7, the upper part of which flares outwardly, whereby the container may be conveniently filled with water or coffee may be poured therefrom.

The upper container 2 is also preferably of glass and it may be open at its top. It is provided at its bottom portion with nearly vertical side walls to constitute an annular portion 5 in which is mounted the retaining device 4 which may be termed a strainer block. The tube 3, which communicates with the annular portion 5, is provided adjacent to its upper end with a sleeve or gasket 8 that is of rubber or other suitable flexible or resilient material which, when inserted within the neck portion 7 of the lower container, hermetically seals the connections between the containers 1 and 2.

The tube 3 ends a short distance above the bottom of the lower container 1, this distance regulating the level of the water remaining in the lower container during the operation of the coffee maker. The strainer block 4 is of solid glass and of nearly cylindrical shape, being slightly tapered to conform to the side walls of the annular portion 5. It is provided with an upwardly projecting portion 9 having a knob 10 thereon to constitute a handle for removing the block 4.

As best shown in Fig. 2, the block 4 is provided on its periphery with vertical grooves 12, continuations of which extend radially across the bottom face of the block 4 a sufficient distance that they communicate with the upper end of the tube 3. These grooves on the exterior of the block 4 thus connect the upper container 2 to the tube 3. While any suitable number of grooves may be thus provided, it is preferred that the grooves are six in number in order that the portions for retaining the straining cloth may conveniently be of the desired number, three.

It will be noted from an inspection of Fig. 2 that the peripheral portions 13 of the block 4 between alternate pairs of grooves 12 are of shorter radius than the three peripheral portions 14 between the other pairs of grooves 12. The three projecting portions 14, which are equi-angularly spaced around the block 4, constitute projections for engaging straining material 15 which extends around the block 4 and under the bottom thereof across the mouth of the tube 3.

The neck portion 7 of the lower container 1 is provided with a sleeve 16 that is of rubber or other suitable resilient and heat insulating material, and which is gripped by a hinged clamping ring 17 of the handle which may be of metal if desired since it is not in contact with the liquid coffee.

In the operation of my improved coffee maker, it may be assumed that the upper container 2 is separated from the lower container 1, and that the latter has been filled with water to a suitable level. It will be understood that the quantity of water will correspond approximately to that of the coffee that is desired to be made. The upper container 2, having the straining cloth 15 and the strainer block 4 in position and with the sleeve 8 upon the tube 3, is then placed in sealing position on the lower container 1 as illustrated. Sufficient ground coffee is then placed in the upper container 2 to make the beverage of the desire dstrength.

The lower container is then heated by any suitable means, such as gas or electricity. The air above the water is heated and the fluid pressure upon the water increases as the temperature rises. This pressure is sufficient to cause an initial flow of water upwardly through the tube 3 and through the grooves 12 around the block 4 into the upper container. This flow occurs very gradually at first but increases with the temperature of the water and the pressure thereabove. When the water in the lower container reaches the boiling point, steam will collect above the surface of the water and the pressure thereon is rapidly increased to force the water upward through the tube 3 at a correspondingly increased rate.

The upward flow of water continues until the level in the lower container falls to the bottom of the tube 3. The hot water in the upper container 2 causes an infusion of the coffee therein. The liquid remains in the upper container as long as sufficient heat is applied to the bottom of the lower container to maintain the required pressure therein. In addition, continued boiling of the water in the lower container will force steam upwardly through the tube 3 at least a portion of which will be condensed in the liquid in the upper container and any uncondensed steam will escape through the liquid to the atmosphere. This process may continue for any desired time but preferably not more than from three to five minutes. At the end of the desired period, heating of the water in the lower container is discontinued.

In case of unduly rapid heating and the production of excessive pressure in the lower container, for any cause whatsoever, the strainer block 4, which is seated by gravity, may be raised to permit the escape of water or steam at a sufficiently rapid rate to relieve the pressure in the lower container. When the pressure is relieved, the block 4 will again be seated in its normal position.

Since the heating has been discontinued, the steam above the surface of the water in the lower container now gradually condenses as the temperature falls with a corresponding lowering of pressure therein. When the steam is sufficiently condensed, the vacuum thus produced causes the water in the upper container to be forced downwardly around the strainer block 4 and through the grooves 12 and the straining material 15 into the tube 3. No ground or sediment are permitted to flow downwardly because of the presence of the straining material 15 and the coffee thus produced is clear by reason of the absence of sediment.

The downward flow continues until all of the liquid is transferred to the lower container whereupon the upper container may be removed. The liquid coffee which is now in the lower container may be served from the latter by using the handle 6 to lift or tilt the lower container as desired.

The strainer block 4 and the straining material 15 may be removed by means of the knob 10, and the block 4 and another piece of straining material 15 may be replaced in position in the manner described above.

Inasmuch as all of the parts of the coffee maker with which the liquid comes in contact are of glass or other nonmetallic material there can be no foreign taste, such as that caused by contact of hot liquid coffee with metal surfaces. The operation of the coffee maker is extremely simple and entirely automatic when heat is applied thereto and is discontinued. The process is continued until certain desirable constituents of the coffee have been infused into the liquid and the beverage thus produced has the natural taste of coffee.

While the apparatus of the present invention has been described with particular reference to coffee, it is also particularly adapted to the making of tea, since the liquid in the upper container is always below the boiling point. The apparatus is also adapted for making infusions of various kinds, such as chemical or pharmaceutical preparations as will be readily understood.

The apparatus contains a single movable member that is necessary to be removed for cleaning or sterilizing of the parts and for the insertion of a new piece of straining material. The strainer block is also movable upward in case of excessive pressures and thus constitutes a safety device.

The foregoing and other advantages will be appreciated by those skilled in the art of manufacturing and operating coffee makers.

I claim:

1. Apparatus for making infusions of coffee, tea or the like, comprising a lower container and an upper container having a tube connected to and extending into said lower container, said upper container having an annular portion above said tube and communicating therewith, a gravity-seated member in said annular portion and provided upon its side and bottom surfaces with a series of grooves constituting communicating passageways which permit liquid to flow from one container to the other, straining material between said member and the walls of said annular portion, and said member having three angularly spaced portions of substantially the internal diameter of said annular portion for clamping said straining material in position, and three intermediate portions of a lesser diameter disposed therebetween which provide a space between the wall of said member and the wall of the annular portion.

2. A straining device for coffee makers or the like comprising a substantially annular block having a plurality of grooves extending over its bottom and up along its side surfaces, a strainer member surrounding said block, and said block having a plurality of angularly spaced segmental portions for retaining said strainer member in operative position which have a greater radius than the intermediate portions.

3. A straining device for coffee makers or the like comprising a block having a series of grooves extending from its bottom up along its side surface, certain of the peripheral portions of the block between the several pairs of grooves projecting outwardly beyond the other portions, and a strainer member surrounding the grooved block and held in position by the projecting portions.

4. A straining device for coffee makers or the like comprising an approximate cylindrical block having spaced grooves extended across to bottom surface and vertically up along its side surface, the peripheral portions between alternate pairs of said grooves having a longer radius than the other peripheral portions, and a straining member surrounding said block and clamped in position by the peripheral portions of longer radius.

5. Apparatus for making infusions of coffee, tea or the like, comprising a bowl having a discharge tube connected to its bottom and a cylindrical enlargement between the upper end of said tube and the bowl, a straining material arranged in said enlargement and extended over the outlet of the bowl, and a retaining element mounted in said enlargement to hold said straining material in place, said retaining element being held in place by gravity and provided with grooves on its surface establishing communicating channels between said discharge tube and said bowl, and spaced segmental projections about its periphery which bear against the inner surface of said enlargement.

GEORGE D. MACBETH.